US009365186B2

(12) United States Patent (10) Patent No.: US 9,365,186 B2
Gulash (45) Date of Patent: Jun. 14, 2016

(54) ADVANCED SEATBELT INTERLOCK USING VIDEO RECOGNITION

(71) Applicant: Toyota Motor Engineering & Manufacturing North America, Inc., Erlanger, KY (US)

(72) Inventor: Emery Charles Gulash, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/461,423

(22) Filed: Aug. 17, 2014

(65) Prior Publication Data

US 2016/0046261 A1 Feb. 18, 2016

(51) Int. Cl.
*G01C 22/00* (2006.01)
*B60R 22/48* (2006.01)
(Continued)

(52) U.S. Cl.
CPC .............. *B60R 22/48* (2013.01); *G05D 1/0055* (2013.01); *G06T 17/20* (2013.01); *B60R 2022/485* (2013.01); *B60R 2022/4891* (2013.01)

(58) Field of Classification Search
CPC .............. B60R 22/00; B60R 21/01512; B60R 21/01566; B60R 21/01552
USPC .......................................................... 701/23
See application file for complete search history.

(56) References Cited

U.S. PATENT DOCUMENTS

| 6,285,937 B1 | 9/2001 | Buckley |
| 8,005,595 B2 | 8/2011 | Marriott et al. |
| 8,487,938 B2 | 7/2013 | Latta et al. |

(Continued)

FOREIGN PATENT DOCUMENTS

| CA | 2748956 A1 | 7/2010 | |
| KR | 101461911 * | 7/2013 | .............. B60R 22/48 |

(Continued)

OTHER PUBLICATIONS

Kelley et al, "Air Bag Fight Looms in Congress", Insurance Institute for Highway Safety, Sep. 9, 1974, in 12 pages, vol. 9, No. 16.

(Continued)

*Primary Examiner* — Michael D Lang
(74) *Attorney, Agent, or Firm* — Christopher G. Darrow; Darrow Mustafa PC

(57) ABSTRACT

Computing devices, methods, and systems for locking vehicle operations when an occupant is not wearing a correctly positioned seatbelt are disclosed. One example method for locking vehicle operations includes identifying an occupant position and a seatbelt position based on information relating to an occupant of the vehicle and a seatbelt associated with the occupant; determining whether the occupant is correctly wearing the seatbelt based at least in part on the occupant position, the seatbelt position, and a reference model; and locking one or more vehicle operations if the occupant is not correctly wearing the seatbelt. Example implementations include using depth-sensing cameras, rendering a three-dimensional model representing the occupant position and the seatbelt position, and comparing the three-dimensional model and the reference model. Examples of vehicle operations that may be locked include ignition operations, gear shift operations, and autonomous driving operations.

20 Claims, 5 Drawing Sheets

(51) Int. Cl.
*G05D 1/00* (2006.01)
*G06T 17/20* (2006.01)

(56) References Cited

U.S. PATENT DOCUMENTS

| | | |
|---|---|---|
| 8,638,985 B2 | 1/2014 | Shotton et al. |
| 2003/0137411 A1* | 7/2003 | Hagenbuch ............ 340/457.1 |
| 2003/0209893 A1 | 11/2003 | Breed et al. |
| 2007/0085669 A1 | 4/2007 | Becker et al. |
| 2007/0195990 A1 | 8/2007 | Levy |
| 2008/0267460 A1* | 10/2008 | Aoki et al. ................ 382/118 |
| 2012/0026331 A1 | 2/2012 | Winner et al. |
| 2014/0077483 A1 | 3/2014 | Jolda |

FOREIGN PATENT DOCUMENTS

| | | |
|---|---|---|
| WO | 2005007468 A1 | 1/2005 |
| WO | 2013080001 A1 | 6/2013 |

OTHER PUBLICATIONS

Extended European Search Report for Application No. EP15181273.2, dated Jan. 13, 2016 (8 pages).

* cited by examiner

ADVANCED SEATBELT INTERLOCK USING VIDEO RECOGNITION

BACKGROUND

The present disclosure relates to a vehicle and more particularly to devices, systems, and methods of determining seatbelt position.

In order to encourage drivers to wear safety belts, cars normally include warning chimes reminding drivers if safety belts are not fastened. Indeed, such warnings are required by the Federal Motor Vehicle Safety Standards and Regulations promulgated by the National Highway Traffic Safety Administration. However, even when a vehicle does alert a driver to the absence of a fastened seatbelt, the driver can always choose to ignore the alert.

Drivers may be able to circumvent these safety features because, often, the only indicator of a seatbelt's status is a sensor located in the seatbelt buckle that detects whether the seatbelt is latched. However, it cannot be assumed that a seatbelt is adequately fulfilling its intended use merely because the seatbelt is latched. For example, even while a seatbelt is latched, a driver is still able to remove the seatbelt's shoulder harness and put it behind his or her back. If a driver wishes to permanently disable the warning feature, the driver may cut off the metal plate portion (called the seatbelt's "tongue") and leave it—or an aftermarket tongue designed to matched the shape of the original—inserted into the buckle, thus completely circumventing the warning feature. Even without intentional circumvention, seatbelts may become twisted or moved out of position inadvertently, without the driver having any indication or knowledge of the problem. Similarly, if the driver slouches, the seatbelt harness may not be positioned correctly over the driver's upper body. Also, if a driver has a non-average body type or shape (for example, if the driver is pregnant, or is significantly large or small), then the seatbelt might not be in the optimum position. In all of these cases, the driver will not be warned because the seatbelt is technically "fastened."

SUMMARY

Disclosed herein are devices, systems, and methods for locking vehicle operations when a vehicle occupant (such as a driver) is not wearing a properly positioned seatbelt (including where the occupant is not wearing the seatbelt at all). In one example implementation, optical sensors are used to determine a seatbelt's position on the occupant. In one example implementation, the optical sensors are depth-sensing cameras. In another example implementation, the vehicle's ignition sequence is prevented from being activated if the vehicle occupant is not wearing a properly positioned seatbelt.

One example computing device for locking vehicle operations includes one or more processors for controlling the operations of the computing device and a memory for storing data and program instructions used by the one or more processors, wherein the one or more processors are configured to execute instructions stored in the memory to: identify an occupant position and a seatbelt position based on relating to an occupant of the vehicle and a seatbelt associated with the occupant; determine whether the occupant is correctly wearing the seatbelt based at least in part on the occupant position, the seatbelt position, and a reference model; and lock one or more vehicle operations if the occupant is not correctly wearing the seatbelt.

One example method for locking vehicle operations includes identifying an occupant position and a seatbelt position based on information relating to an occupant of the vehicle and a seatbelt associated with the occupant; determining whether the occupant is correctly wearing the seatbelt based at least in part on the occupant position, the seatbelt position, and a reference model; and locking one or more vehicle operations if the occupant is not correctly wearing the seatbelt.

One example system for locking vehicle operations includes one or more optical sensors associated with a vehicle; a computing device in communication with the one or more optical sensors, the computing device comprising one or more processors for controlling the operations of the computing device and a memory for storing data and program instructions used by the one or more processors, wherein the one or more processors are configured to execute instructions stored in the memory to: identify an occupant position and a seatbelt position based on information received from the one or more optical sensors relating to an occupant of the vehicle and a seatbelt associated with the occupant; determine whether the occupant is correctly wearing the seatbelt based at least in part on the occupant position, the seatbelt position, and a reference model; and lock one or more vehicle operations if the occupant is not correctly wearing the seatbelt.

BRIEF DESCRIPTION OF THE DRAWINGS

The description herein makes reference to the accompanying drawings wherein like reference numerals refer to like parts throughout the several views, and wherein.

DETAILED DESCRIPTION

This disclosure describes devices, systems, and methods for locking vehicle operations when a vehicle occupant (such as a driver) is not wearing a properly positioned seatbelt (including where the occupant is not wearing the seatbelt at all). Optical sensors can be used to determine a seatbelt's position on the occupant, and, in one example implementation, the optical sensors are depth-sensing cameras. In another example implementation, a three-dimensional model representing the occupant and the seatbelt is rendered. In another example implementation, reference models are used in determining if the occupant is wearing the seatbelt correctly. In another example implementation, the vehicle's ignition sequence is prevented from being activated if the vehicle occupant is not wearing a properly positioned seatbelt. In another example, an autonomously driven vehicle can automatically pull over to the side of the road if the vehicle occupant is not wearing a properly positioned seatbelt. In another example, the vehicle will sound a warning before the vehicle operations interlock goes into effect.

Figure 1:
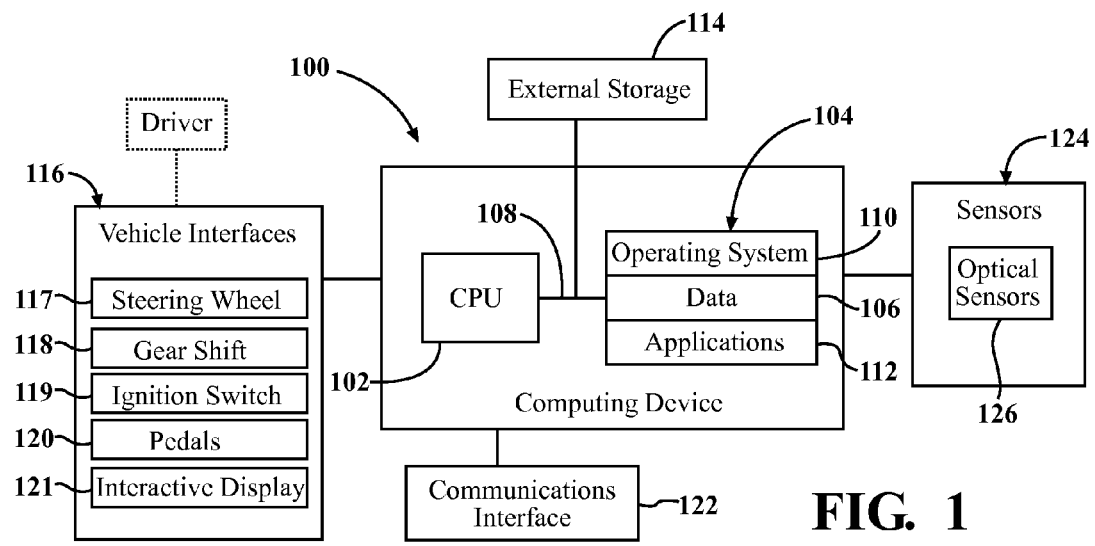
FIG. 1 is a schematic block diagram of a computing device for locking vehicle operations based on seatbelt status.

FIG. 1 is a schematic block diagram of a computing device 100 for a vehicle interlock based on seatbelt engagement and position. The computing device 100 can be any type of vehicle-installed, handheld, desktop, or other form of single computing device, or can be composed of multiple computing devices. A processing unit 102 in the computing device can be a conventional central processing unit (CPU) or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to implement the vehicle operations interlock, as described below. The computing device 100 can also include secondary, additional, or external storage 114, for example, a memory card, flash drive, or any other form of computer readable medium. In one implementation, the installed applications 112 can be stored in whole or in part in the external storage 114 and loaded into the memory 104 as needed for processing.

The computing device 100 can be in direct or indirect communication with one or more vehicle interfaces 116 through which a driver can control the vehicle. Example vehicle interfaces 116 include a steering wheel 117, a gear shift 118, an ignition switch 119, pedals 120, or any other vehicle interface 116. A vehicle interface 116 may also include, for example, an interactive display 121 through which the driver can issue commands to the vehicle, or a voice recognition system (not shown) configured to receive driver commands. The computing device 100 can also include a communications interface 122 in order to send data to and receive data from remote devices or servers.

The computing device 100 can also be in direct or indirect communication with one or more sensors 124, which can be optical sensors 126 such as cameras. These optical sensors 126 can include depth-sensing features, such as those found in consumer products such as the Microsoft Kinect™, described in U.S. Pat. No. 8,638,985 to Shotton, et. al. and U.S. Pat. No. 8,487,938 to Latta, et. al., which are hereby fully incorporated into this application by reference. The optical sensors 126 can capture image data that can be sent to the computing device 100 through the bus 108 or can be stored in the memory 104 or the external storage 114 for later retrieval by the computing device 100.

Figure 2:
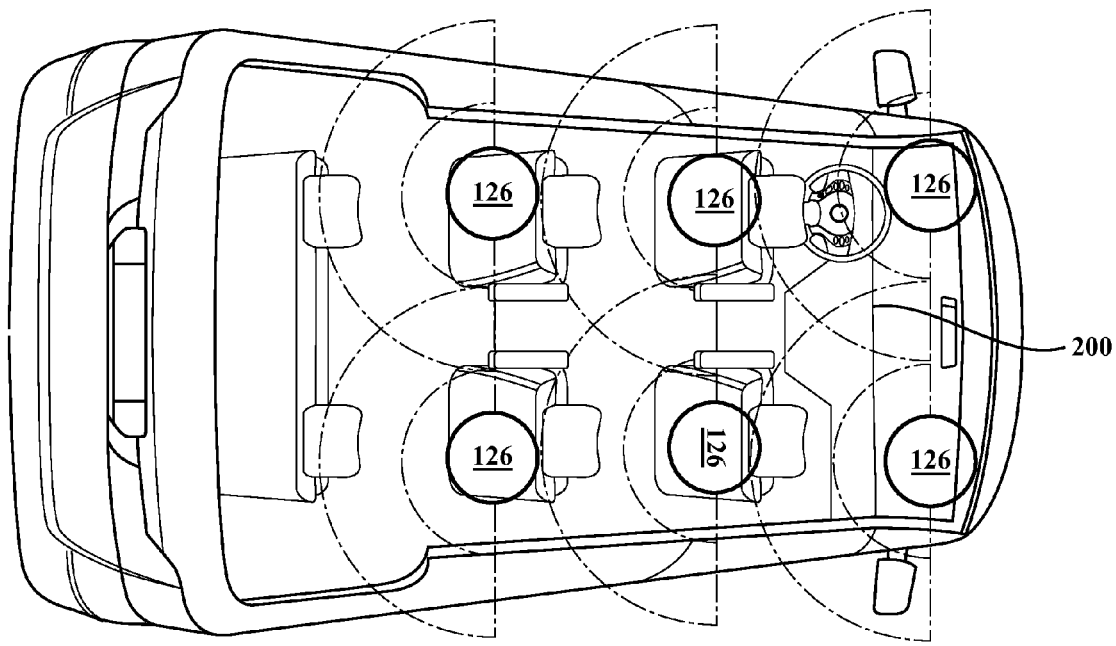
FIG. 2 is a pictorial representation of a vehicle including optical sensors used by the computing device of FIG. 1.

FIG. 2 is a pictorial representation of a vehicle 200 including optical sensors 126 used by the computing device of FIG. 1. The computing device 100 can be located within the vehicle 200 or in an alternate location remote from the vehicle 200. The computing device 100, if remote from the vehicle 200, can communicate with the vehicle 200 using the communications interface 122. In accordance with one example implementation, one or more optical sensors 126 are positioned in the cabin of the vehicle 200 so that a vehicle occupant is within the optical sensors' 126 field of view.

In one example implementation, the occupant is the driver of the vehicle 200. An optical sensor 126 can be placed in the center area of the driver's console or dashboard and can provide a generally head-on view of the driver. Alternatively, or in addition, optical sensors 126 can be placed on one or both of the vehicle's 200 A-pillars to provide a more dimensioned view of the driver and/or other occupant. In one example implementation, one or more optical sensors 126 could be placed at a high vantage point relative to the occupant, such as embedded in the ceiling, in order to ensure that the seatbelt remains within the field of view, even where the seatbelt would be obscured from a frontal view by the occupant's body or clothing.

In one example implementation, as illustrated in FIG. 2, multiple optical sensors 126 can be placed throughout the vehicle 200 to monitor other passengers as well, including occupants sitting in the passenger seat or in the rear seats. Vehicle operations can thus be locked if the driver or other occupants are not wearing their seatbelts properly. Accordingly, the disclosed implementations may be employed with respect to any one or more persons within the vehicle 200 without departing from the spirit or scope of the invention, whether such person is the driver or another vehicle occupant. As such, the terms "occupant" and "driver" are used interchangeably within this application.

The optical sensors 126 may be traditional photo cameras (capturing RGB data), depth-sensing cameras, or a combination of the two. Employing multiple optical sensors 126 can provide for a wider field of view so that the computing device 100 can monitor more than one occupant. For example, FIG. 2 illustrates a vehicle 200 with multiple optical sensors 126 in each row of seating in order to monitor every occupant in the vehicle 200. Of course, more or fewer optical sensors 126 can be employed without departing from the spirit or scope of the invention.

Figure 3A:
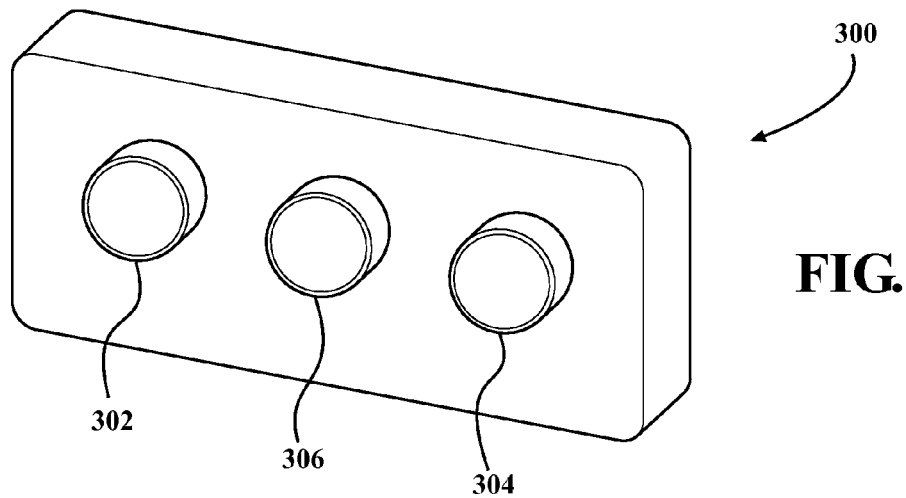
FIG. 3A is a perspective view of a depth-sensing camera, in accordance with an example implementation.

FIG. 3A is a perspective view of a depth-sensing camera 300, which, in an example implementation, can be used as for the one or more optical sensors 126. Example depth-sensing cameras 300 may include such products as the Microsoft Kinect™. In an example implementation, each depth-sensing camera 300 can include an infrared projector 302 and a photodetector 304. The depth-sensing camera 300 can also include a photo camera 306 to capture RGB data.

Depth-sensing cameras 300 can monitor occupants' seatbelt usage because the data they can provide to the computing device 100 can allow the computing device 100 to construct a three-dimensional model of the occupant and seatbelt. The data provided by the depth-sensing cameras 300 can thus allow for a precise three-dimensional rendering of the scene, even in low light and without regard to color or texture. Therefore, even if an occupant is, for example, wearing a shirt that is similar in color or texture to the seatbelt, seat, or other part of the background, or where the interior of the vehicle 200 is not well lit, the computing device 100 will still be able to determine the position of the occupant and the seatbelt, as described in more detail below. Traditional pattern analysis techniques performed on RGB data alone, without depth data, would likely not be sufficient to distinguish or ascertain the boundaries of the occupant and the seatbelt in such cases.

Figure 3B:
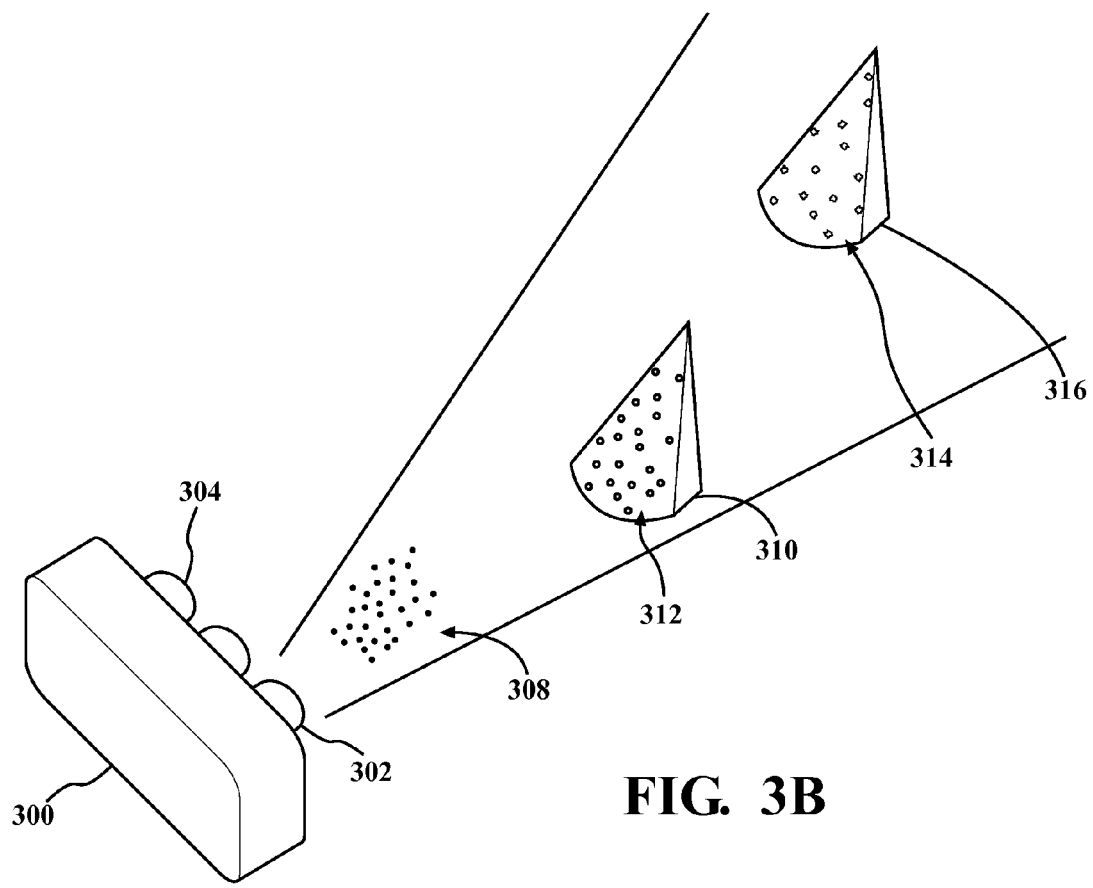
FIG. 3B is a pictorial representation illustrating light patterns used by the depth-sensing camera to determine depth, in accordance with an example implementation.

FIG. 3B is a pictorial representation illustrating light patterns used by the depth-sensing camera 300 to determine depth, in accordance with an example implementation. In this example, the infrared projector 302 emits a pre-defined light pattern 308 at a preset focal length across the scene, that is, within the depth-sensing camera's 300 field of view. The light pattern 308 then reflects back off objects within the scene as backscatter, which backscatter can be detected by the photodetector 304. The computing device 100, or a separate processor associated with the depth-sensing camera 300, can compare the backscatter to the known initial light pattern 308 emitted by the infrared projector 302. The computing device 100, or a separate processor associated with the depth-sensing camera 300, can calculate the distance to each portion of the visual field based on the magnitude of deformation detected in the backscatter of the light pattern 308, as the light pattern 308 will have become more deformed the farther it travels. This can reveal objects in three-dimensional space.

For example, a close object 310 will reflect a backscatter 312 that is less deformed than a backscatter 314 reflected off a farther object 316. Similarly, variations in the deformation of the light pattern 308 within a respective object will reveal the contours of that object based on relative distance from the infrared projector 302. As described in more detail below, these objects may correspond to limbs of a person visible within the field of view of the depth-sensing camera 300. If the foregoing operations are performed by a separate processor associated with the depth-sensing camera 300 instead of by the computing device 100 itself, the resulting three-dimensional rendering may be sent to the computing device 100, for example through the bus 108 or communications interface 122. In any case, the depth data provided by the depth-sensing camera 300 allow the computing device 100 to obtain or render a three-dimensional rendering of the scene.

If there are multiple optical sensors 126 placed at different points in the vehicle 200, then the photo camera 306 (FIG. 3A) may also be used to detect depth. Detecting depth using the photo camera 306 can be accomplished by parallax image analysis, by which the computing device 100 can triangulate the position of objects within the scene based on the stereo input received from the multiple optical sensors 126. The computing device 100 can then create a three-dimensional rendering of the scene, including objects within the scene (such as the occupant and the seatbelt).

Once the computing device 100 has a three-dimensional rendering of the scene, the computing device 100 can identify the occupant and the seatbelt within the scene. In one implementation, this can be accomplished with a reference to one or more databases containing skeletal models of human body positions and movement. These databases may be stored in memory 104 or in external storage 114, or they may be accessed from a remote location using the communications interface 122.

Figure 4:
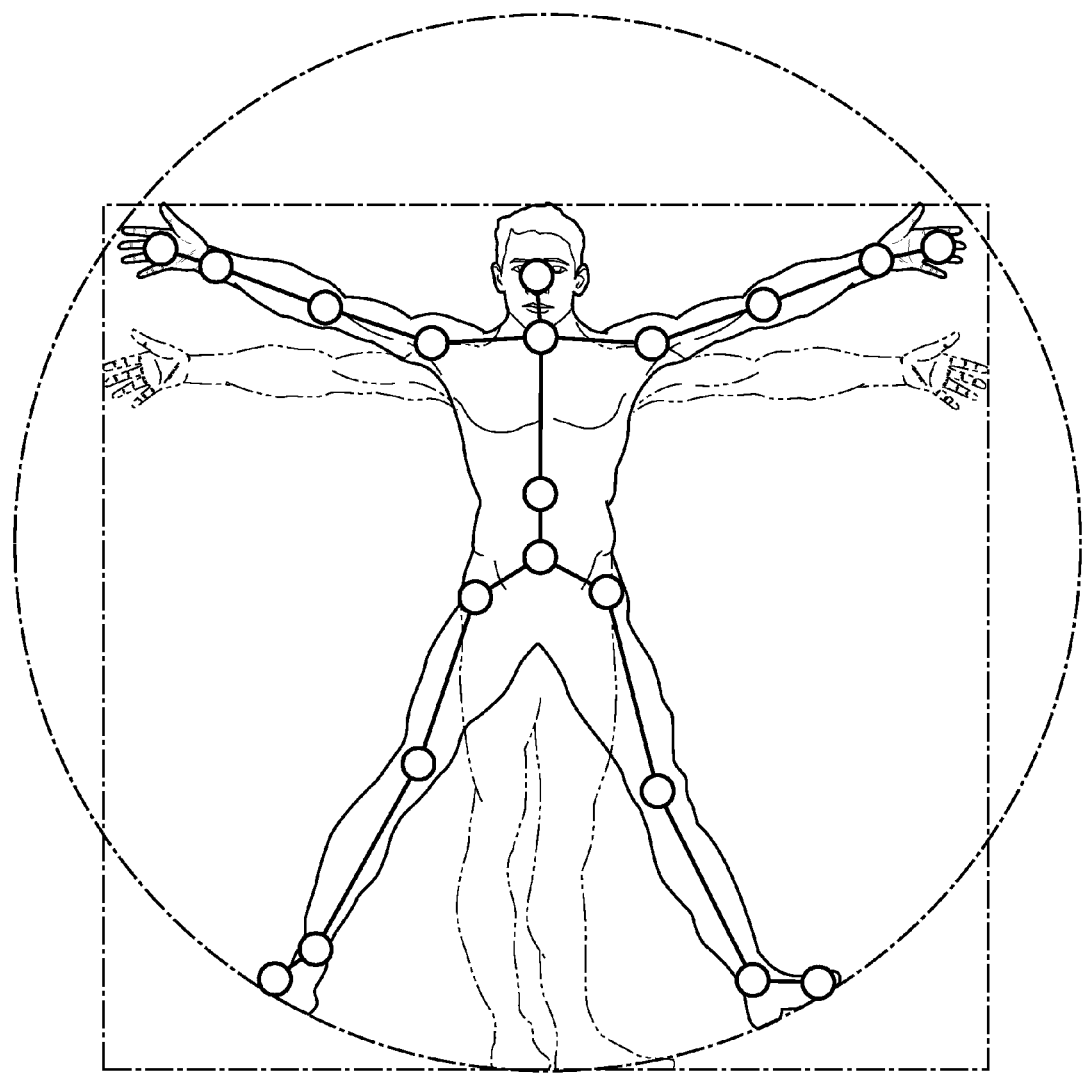
FIG. 4 is a pictorial representation of an example skeletal model.

FIG. 4 is a pictorial representation of an example skeletal model 400 describing a skeletal joint relationship. In one example implementation, the skeletal model 400 can be a three-dimensional object. The databases may include multiple skeletal models in sitting positions, especially in a vehicle seat. The databases may also include models of various types of seatbelts (not shown), and of skeletal models wearing seatbelts in correct and incorrect ways. The skeletal models contained in the one or more databases may reflect a variety of body types and body shapes, as the optimum seatbelt position may depend on such factors. For example, if an occupant is pregnant (which would be detectable based on the three-dimensional rendering of the scene), the correct seatbelt position may be different. The skeletal model 400 is but one example of the skeletal models that can be included in the databases.

In one example implementation, the body type of the occupant could be a factor in whether the computing device 100 executes the vehicle operations interlock. For example, if the computing device 100 detects from the occupant's body dimensions that the occupant is a child, then the computing device 100 could lock vehicle operations in the event that such occupant is not wearing the seatbelt correctly. On the other hand, if the occupant is an adult, then the computing device 100 could ignore an incorrect seatbelt position.

Figure 5:
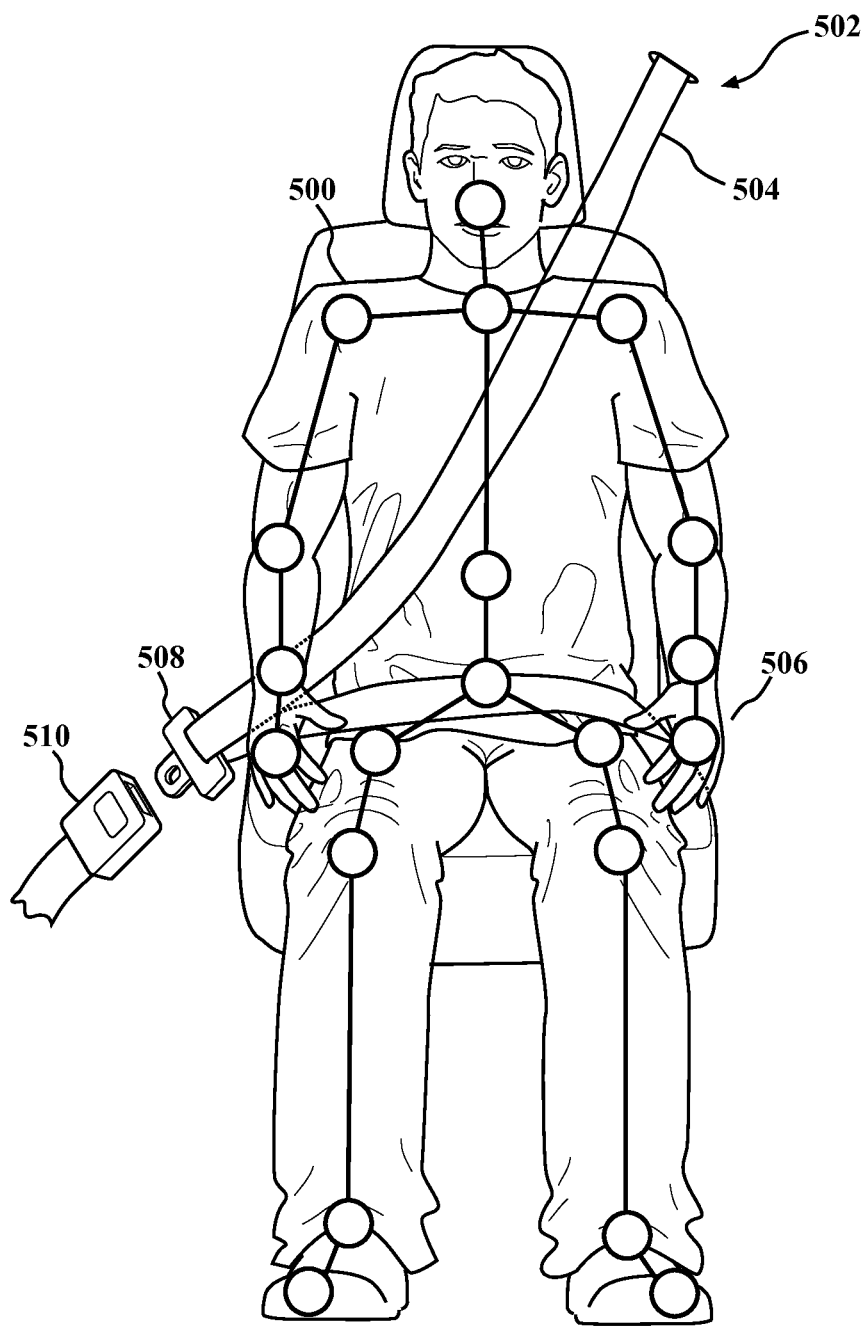
FIG. 5 is a pictorial representation of a vehicle occupant wearing a seatbelt, and the skeletal joint relationship detectable in accordance with an example implementation.

FIG. 5 is a pictorial representation of a vehicle occupant 500 wearing a seatbelt 502. Based on a comparison of the three-dimensional rendering of the scene with the various skeletal models, the computing device 100 can extrapolate to a high degree of confidence (for example, by using statistical and probability analysis) the joints and limbs (e.g., arms, shoulders, chest, torso, etc.) of the occupant 500 within the scene. The computing device 100 can thus determine the position of the occupant 500, including the skeletal joint relationship of the occupant 500. Similarly, with reference to databases, the computing device 100 can identify the seatbelt 502 and determine the position of the seatbelt 502, i.e., how the occupant 500 is wearing the seatbelt 502, or whether the occupant 500 is not wearing the seatbelt 502 at all.

The seatbelt 502 can include several components, each of which can be identified by the computing device 100 (such as with reference to the seatbelt models in the one or more databases, as described above). The components can include a shoulder harness 504, a lap belt 506, a tongue 508, and a buckle 510. The buckle 510 can include a buckle sensor 512 that detects if the tongue 508 is inserted into the buckle 510.

By comparing the position of the occupant 500 and the seatbelt 502 to the reference skeletal models of correct and incorrect positions of wearing a seatbelt, the computing device 100 can determine if the vehicle operations should be locked. For example, incorrect seatbelt positions can include the shoulder harness 504 being across the occupant's 500 neck or lower midsection rather than across the chest centered on the collarbone, as is recommended. Incorrect seatbelt positions can also include the shoulder harness 504 being placed under the occupant's 500 arm or behind the occupant's 500 back.

The computing device 100 can also detect if the lap belt 506 or shoulder harness 504 becomes twisted or otherwise moved out of position. Of course, if the computing device 100 detects that the seatbelt 502 remains unextended at the side of the vehicle (i.e., the occupant is not wearing the seatbelt 502 at all), the computing device 100 will also be able to lock the vehicle operations. Therefore, in one example implementation, the buckle sensor 512 may be queried to determine if the seatbelt 502 is not latched at all. If so, then the computing device 100 can lock vehicle operations without the use of the optical sensors 126, thus saving computing resources.

The optical sensors 126 can transmit image information to the computing device 100 many times per second through a video stream (for example, up to sixty images per second), so that the computing device 100 can process position information in real time and track the movement of the occupant 500 and the seatbelt 502. By tracking the movements in real time, the computing device 100 is also able to extrapolate the probable position of the occupant 500 and/or seatbelt 502 in the event that portions of the occupant's 500 body or the seatbelt 502 become obscured during movement, based on the last known position of the occupant 500 and/or seatbelt 502. This can be further facilitated by including movement information as part of the skeletal models in the databases.

As indicated, if the computing device 100 determines that the occupant 500 (which may be the driver or another occupant) is not wearing the seatbelt 502 correctly, the vehicle operations interlock can be effected, whereby selected vehicle operations are locked. For example, the driver may be prevented from initiating the engine ignition sequence using the ignition switch 119 or from engaging a drive gear from a parked position using the gear shift 118. Furthermore, one or more affirmative actions can be taken by the computing device 100 in order to effect the vehicle operations interlock. For example, the inventive devices, systems, and methods may be applied in the context of vehicle systems used for autonomous driving, which vehicle systems control driving operations and allow the vehicle 200 to drive autonomously without active steering and or other active control by the driver. In one implementation, for example, the driver (as the occupant 500) could be required to remain seated with the seatbelt 502 fastened in order to maintain the autonomous driving feature. Thus, if the driver unbuckles the seatbelt 502 during vehicle operation, or moves the seatbelt 502 out of position, the vehicle 200 can deliver an audible or visual warning to the driver to re-engage the seatbelt 502. If the driver does not do so, the computing device 100 can cause the vehicle 200 to automatically pull over to the side of the road and prevent the driver from further operating the vehicle 200. Alternatively, the computing device 100 could disable automatic driving mode and/or switch the vehicle 200 to manual mode.

Other vehicle operations that can be locked when the occupant 500 is not correctly wearing the seatbelt 502 could include a vehicle multimedia system, or other vehicle systems as may be appropriate. Moreover, as detailed above, the vehicle operations interlock could be extended to cover not only the driver but also other vehicle occupants. Accordingly, in such implementations, if one or more passengers were not wearing their respective seatbelts correctly, the driver could still be prevented from engaging the selected vehicle operations.

Figure 6:
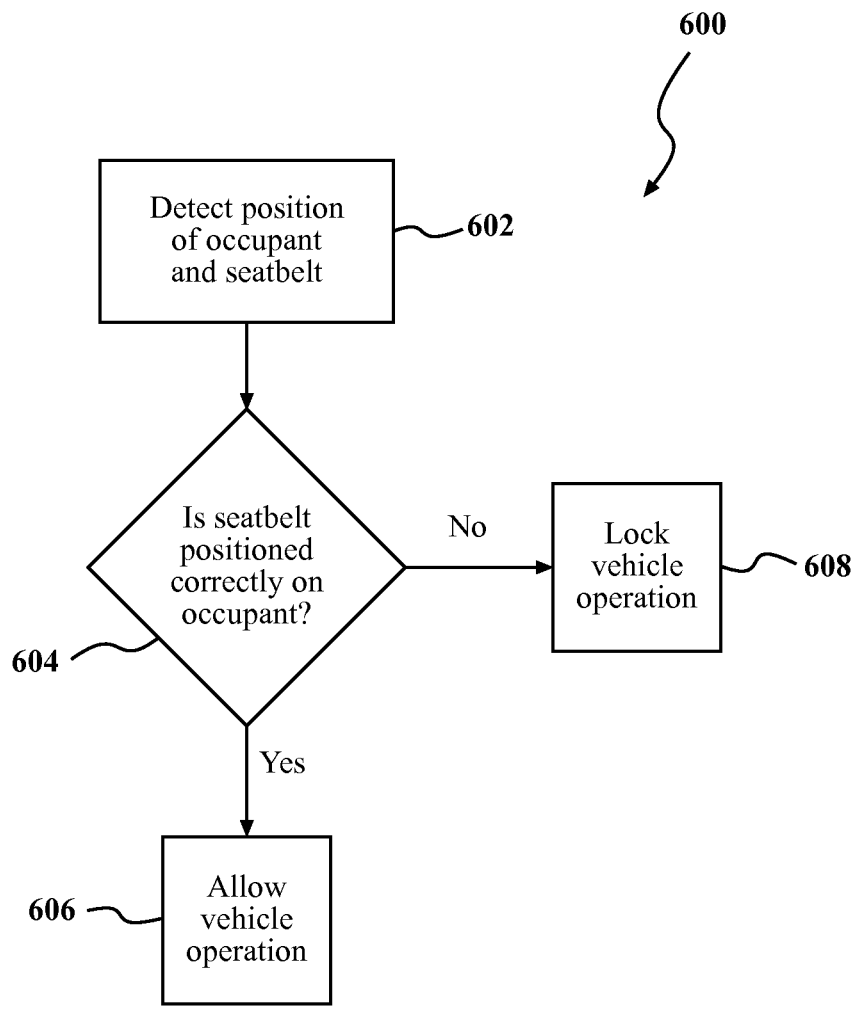
FIG. 6 is a logic flowchart of an example process performed using the computing device of FIG. 1.

FIG. 6 is an example logic flowchart of a process 600 for a vehicle interlock based on seatbelt positioning implemented by the computing device 100 in accordance with an example implementation. In step 602, the computing device 100 detects the positioning of the occupant 500 and the seatbelt 502. For example, the occupant 500 could be the driver of the vehicle or a passenger. The computing device 100 can be configured to detect the positioning based on data received from the optical sensors 126, which data may include photo or video data, depth data, three-dimensional renderings, or any combination of these, as described in more detail above. In addition, the computing device 100 may also at this step accept input from the buckle sensor 512 to detect the position of the seatbelt 502, as described in more detail above (i.e., if the buckle sensor 512 indicates that the seatbelt 502 is unlatched, then it is clear that the seatbelt 502 is not positioned on the occupant 500). In step 604, the computing device 100 determines whether the seatbelt 502 is positioned correctly on the occupant 500. If yes, then, in step 606, a selected vehicle operation is allowed. If no, then, in step 608, the selected vehicle operation is locked.

In one example implementation, the process 600 is prompted by a command received by the computing device 100. For example, the driver could be attempting to initiate the engine ignition sequence using the ignition switch 118 (or other examples as described above), in which case, the process 600 is triggered and the computing device 100 detects the seatbelt's 502 status in accordance with steps 602 and 604. In another example implementation, the computing device 100 continuously monitors the seatbelt's 502 status in accordance with steps 602 and 604, so that if at any time during vehicle operation the occupant 500 moves the seatbelt 502 out of position or removes the seatbelt 502, the computing device 100 can affirmatively act to lock selected vehicle operations. These affirmative actions may include, by way of example only: automatically driving the vehicle to the side of the road; disengaging the gear; placing the vehicle into park; shutting down the engine; or any combination of these, or any other type of action that locks the selected vehicle operation. In addition, as described above, the computing device 100 can, upon detecting the mis-positioned seatbelt 502, issue an audible or visual warning before affirmatively locking the vehicle operation, in order to give the occupant 500 (or driver, if not the occupant 500) an opportunity to correct the seatbelt 502 positioning without being subject to the vehicle operation interlock.

The foregoing description relates to what are presently considered to be the most practical embodiments and implementations. It is to be understood, however, that the disclosure is not to be limited to these embodiments and implementations but, on the contrary, is intended to cover various modifications and equivalent arrangements included within the spirit and scope of the appended claims. For example, in the embodiments and implementations described above, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc. The scope of the claims is thus to be accorded the broadest interpretation so as to encompass all such modifications and equivalent structures as is permitted under the law.

What is claimed is:

1. A computing device for a vehicle, comprising:
one or more processors for controlling the operations of the computing device; and
a memory for storing data and program instructions used by the one or more processors, wherein the one or more processors are configured to execute instructions stored in the memory to:
identify an occupant position and a seatbelt position based on information relating to an occupant of the vehicle and a seatbelt associated with the occupant;
determine whether the occupant is correctly wearing the seatbelt based at least in part on the occupant position, the seatbelt position, and a reference model including one or more skeletal models wearing seatbelts in correct and incorrect ways; and
lock one or more vehicle operations if the occupant is not correctly wearing the seatbelt.

2. The computing device of claim 1, wherein the information relating to the occupant and the seatbelt are received from one or more optical sensors associated with the vehicle.

3. The computing device of claim 2, wherein the one or more optical sensors are cameras.

4. The computing device of claim 2, wherein the one or more optical sensors are depth-sensing cameras.

5. The computing device of claim 1, wherein the one or more processors are further configured to render a three-dimensional model representing the occupant position and the seatbelt position.

6. The computing device of claim 5, wherein the determining whether the occupant is correctly wearing the seatbelt is based at least in part on a comparison of the three-dimensional model and the reference model.

7. The computing device of claim 5, wherein at least one of the three-dimensional model and the reference model comprise skeletal joint relationship information.

8. The computing device of claim 1, wherein the reference model is received by the computing device from a remote source.

9. The computing device of claim 1, wherein the one or more vehicle operations include at least one of an ignition operation and a gear shift operation.

10. The computing device of claim 1, wherein the one or more processors are further configured to issue a warning before locking the one or more vehicle operations.

11. A computing device for a vehicle, comprising:
one or more processors for controlling the operations of the computing device; and a memory for storing data and program instructions used by the one or more processors, wherein the one or more processors are configured to execute instructions stored in the memory to:
- identify an occupant position and a seatbelt position based on information relating to an occupant of the vehicle and a seatbelt associated with the occupant;
- determine whether the occupant is correctly wearing the seatbelt based at least in part on the occupant position, the seatbelt position, and a reference model including at least one of: one or more skeletal models, one or more seatbelt models, or one or more skeletal models wearing seatbelts in correct and incorrect ways; and
- lock one or more vehicle operations if the occupant is not correctly wearing the seatbelt, the one or more vehicle operations including an autonomous driving operation.

12. A computing device for a vehicle, comprising:
one or more processors for controlling the operations of the computing device; and
a memory for storing data and program instructions used by the one or more processors, wherein the one or more processors are configured to execute instructions stored in the memory to:
- identify an occupant position and a seatbelt position based on information relating to an occupant of the vehicle and a seatbelt associated with the occupant;
- determine whether the occupant is correctly wearing the seatbelt based at least in part on the occupant position, the seatbelt position, and a reference model including at least one of: one or more skeletal models, one or more seatbelt models, or one or more skeletal models wearing seatbelts in correct and incorrect ways;
- lock one or more vehicle operations if the occupant is not correctly wearing the seatbelt; and
- issue one or more commands to one or more vehicle systems to autonomously divert the vehicle to a safe location.

13. A computer-implemented method for a vehicle, comprising:
- identifying an occupant position and a seatbelt position based on information relating to an occupant of the vehicle and a seatbelt associated with the occupant;
- determining whether the occupant is correctly wearing the seatbelt based at least in part on the occupant position, the seatbelt position, and a reference model including one or more skeletal models wearing seatbelts in correct and incorrect ways; and
- locking one or more vehicle operations if the occupant is not correctly wearing the seatbelt.

14. The method of claim 13, wherein the information relating to the occupant and the seatbelt is received from one or more optical sensors associated with the vehicle.

15. The method of claim 14, wherein the one or more optical sensors are depth-sensing cameras.

16. The method of claim 13, further comprising rendering a three-dimensional model representing the occupant position and the seatbelt position.

17. The method of claim 16, wherein the determination whether the occupant is correctly wearing the seatbelt is based at least in part on a comparison of the three-dimensional model and the reference model.

18. The method of claim 16, wherein at least one of the three-dimensional model and the reference model comprise skeletal joint relationship information.

19. The method of claim 13, wherein the one or more vehicle operations includes at least one of an ignition operation, a gear shift operation, and an autonomous driving operation.

20. A system comprising:
one or more optical sensors associated with a vehicle;
a computing device in communication with the one or more optical sensors, the computing device comprising one or more processors for controlling the operations of the computing device and a memory for storing data and program instructions used by the one or more processors, wherein the one or more processors are configured to execute instructions stored in the memory to:
- identify an occupant position and a seatbelt position based on information received from the one or more optical sensors relating to an occupant of the vehicle and a seatbelt associated with the occupant;
- determine whether the occupant is correctly wearing the seatbelt based at least in part on the occupant position, the seatbelt position, and a reference model including one or more skeletal models wearing seatbelts in correct and incorrect ways; and
- lock one or more vehicle operations if the occupant is not correctly wearing the seatbelt.

\* \* \* \* \*